United States Patent
Vander Lind et al.

(10) Patent No.: US 9,325,224 B2
(45) Date of Patent: Apr. 26, 2016

(54) ELECTRICALLY-ISOLATED AND LIQUID-COOLED ROTOR AND STATOR ASSEMBLIES

(71) Applicant: Google Inc., Mountain View, CA (US)

(72) Inventors: Damon Vander Lind, Alameda, CA (US); Leo Francis Casey, San Francisco, CA (US); George Edward Homsy, San Rafael, CA (US)

(73) Assignee: Google Inc., Mountain View, CA (US)

( * ) Notice: Subject to any disclaimer, the term of this patent is extended or adjusted under 35 U.S.C. 154(b) by 108 days.

(21) Appl. No.: 14/142,825

(22) Filed: Dec. 28, 2013

(65) Prior Publication Data
US 2015/0188367 A1 Jul. 2, 2015

(51) Int. Cl.
| | |
|---|---|
| F03D 9/00 | (2006.01) |
| H02P 9/04 | (2006.01) |
| H02K 9/00 | (2006.01) |
| H02K 9/20 | (2006.01) |
| H02K 9/19 | (2006.01) |
| H02K 1/30 | (2006.01) |
| F03D 1/02 | (2006.01) |
| H02K 1/18 | (2006.01) |
| H02K 9/193 | (2006.01) |

(52) U.S. Cl.
CPC .. H02K 9/19 (2013.01); F03D 1/02 (2013.01); F03D 9/002 (2013.01); H02K 1/185 (2013.01); H02K 1/187 (2013.01); H02K 1/30 (2013.01); H02K 9/193 (2013.01); F05B 2240/921 (2013.01)

(58) Field of Classification Search
CPC ............. H02K 1/06; H02K 1/12; H02K 1/18; H02K 1/187
USPC ............. 290/43, 53, 54, 44; 310/216.113, 54
See application file for complete search history.

(56) References Cited

U.S. PATENT DOCUMENTS

| | | | | |
|---|---|---|---|---|
| 2,344,689 | A * | 3/1944 | Frazier | 361/299.4 |
| 2,554,191 | A * | 5/1951 | Huber | 417/414 |
| 3,867,655 | A * | 2/1975 | Stengel et al. | 310/66 |
| 4,593,202 | A * | 6/1986 | Dickinson | 290/54 |
| 4,825,114 | A * | 4/1989 | Ohtsuka et al. | 310/90 |
| 5,334,895 | A * | 8/1994 | Morioka et al. | 310/67 R |
| 6,169,344 | B1 * | 1/2001 | Tsuruhara | 310/58 |

(Continued)

FOREIGN PATENT DOCUMENTS

| | | |
|---|---|---|
| WO | 2012093942 | 7/2012 |
| WO | WO 2012093942 A1 * | 7/2012 |

*Primary Examiner* — Tulsidas C Patel
*Assistant Examiner* — Charles Reid, Jr.
(74) *Attorney, Agent, or Firm* — McDonnell, Boehnen, Hulbert & Berghoff, LLP

(57) ABSTRACT

Disclosed are systems and rotor/stator assemblies with improved electrical isolation. An example rotor/stator assembly may include a rotor, a rotor housing, a rotor insulator, a stator, a stator plate, and a stator insulator. The rotor may be electrically isolated from the rotor housing by the rotor insulator, and the stator may be electrically isolated from the stator plate by the stator insulator. The stator may be disposed coaxial to the rotor. The rotor/stator assembly may function as a motor, and the stator may be configured to cause the rotor to rotate about the stator in response to an input of electrical energy to the stator. Alternatively or additionally, the rotor/stator may function as an electrical generator. The rotor may be configured to rotate about the stator, and the stator may be configured to produce electrical energy in response to rotation of the rotor relative to the stator.

22 Claims, 5 Drawing Sheets

(56) References Cited

U.S. PATENT DOCUMENTS

| | | |
|---|---|---|
| 7,154,191 B2 * | 12/2006 | Jansen et al. ............... 290/55 |
| 7,382,061 B2 * | 6/2008 | Ferraro ...................... 290/52 |
| 7,579,742 B1 * | 8/2009 | Rittenhouse ................ 310/257 |
| 7,629,715 B1 | 12/2009 | Sortore et al. |
| 8,148,840 B2 * | 4/2012 | Gradle ....................... 290/53 |
| 8,310,124 B2 | 11/2012 | Davis et al. |
| 8,466,649 B2 | 6/2013 | Hyde et al. |
| 2002/0027053 A1 * | 3/2002 | Back et al. ................. 192/3.3 |
| 2004/0108781 A1 * | 6/2004 | Razzell et al. ............. 310/112 |
| 2008/0272604 A1 * | 11/2008 | Versteegh ................... 290/55 |
| 2010/0237629 A1 * | 9/2010 | Gray ........................... 290/1 R |
| 2011/0109100 A1 * | 5/2011 | Versteegh ................... 290/1 B |
| 2012/0104763 A1 * | 5/2012 | Lind ........................... 290/55 |
| 2012/0161554 A1 | 6/2012 | Ghelardi et al. |
| 2012/0280511 A1 * | 11/2012 | Eriksen ...................... 290/55 |
| 2013/0038065 A1 * | 2/2013 | Versteeg .................... 290/53 |
| 2013/0270937 A1 * | 10/2013 | Rasmussen ................. 310/54 |
| 2013/0293041 A1 * | 11/2013 | Steinbauer et al. ......... 310/52 |
| 2013/0334819 A1 * | 12/2013 | Fricke et al. ............... 290/44 |
| 2015/0037136 A1 * | 2/2015 | Fairman et al. ............. 415/68 |

* cited by examiner

ELECTRICALLY-ISOLATED AND LIQUID-COOLED ROTOR AND STATOR ASSEMBLIES

BACKGROUND

Unless otherwise indicated herein, the materials described in this section are not prior art to the claims in this application and are not admitted to be prior art by inclusion in this section.

Power generation systems may convert chemical and/or mechanical energy (e.g., kinetic energy) to electrical energy for various applications, such as utility systems. As one example, a wind energy system may convert kinetic wind energy to electrical energy.

SUMMARY

A wind energy system may take the form of an aerial wind turbine (AWT) system. AWT systems may extract useful power from the wind for various purposes such as, for example, generating electricity, lifting or towing objects or vehicles, etc.

In an AWT system, it may be desirable to achieve a high operating voltage so as to, for example, reduce the mass of transmission wires in the AWT system. While the operating voltage of a single motor or generator in such an application may be limited by practical electronics, a higher operating voltage may be achieved by, for example, stacking motors or generators in series.

However, such a high operating voltage may pose isolation risks (e.g., risks of shorts or other faults) for motors or generators in the AWT system. In particular, if motors or generators in the AWT system are referenced to different ground voltages, or if a ground is referenced to the bus voltage of another motor or generator, a loss of isolation could lead to the application of voltages to some components in the AWT system far beyond the voltages at which these components typically operate.

Disclosed are rotor/stator assemblies for use as motors and/or generators in an AWT system. Beneficially, some examples described herein may allow for high operating voltages and improved isolation.

In one aspect, a motor is disclosed that may include a rotor, a rotor housing, a rotor insulator, a stator, a stator plate, and a stator insulator. The rotor may be electrically isolated from the rotor housing by the rotor insulator. Similarly, the stator may be electrically isolated from the stator plate by the stator insulator. The stator may be disposed coaxial to the rotor, and the stator may be configured to cause the rotor to rotate about the stator in response to an input of electrical energy to the stator.

In another aspect, an electrical generator is disclosed that may include a rotor, a rotor housing, a rotor insulator, a stator, a stator plate, a stator insulator, and a pump. The rotor may be electrically isolated from the rotor housing by the rotor insulator. Similarly, the stator may be electrically isolated from the stator plate by the stator insulator. The stator may be disposed coaxial to the rotor, and the rotor may be configured to rotate about the stator. The stator may be configured to produce electrical energy in response to rotation of the rotor relative to the stator. The pump may be designed to pump a coolant through the electric generator.

In a further aspect, an aerial wind turbine is disclosed that may include a ground station, an aerial vehicle, a rotor/stator assembly, a propeller, and an electrically conductive tether. The rotor/stator assembly may include a rotor, a rotor shaft, a rotor housing, a rotor insulator, a stator, a stator plate, and a stator insulator. The rotor may be electrically isolated from the rotor housing by the rotor insulator. Similarly, the stator may be electrically isolated from the stator plate by the stator insulator. The stator may be disposed coaxial to the rotor, and the rotor may be configured to rotate about the stator. The propeller may be coupled to the rotor shaft. The electrically conductive tether may be coupled to the stator and to the ground station. The rotor/stator assembly may be designed for at least two modes of operation: (i) a flight mode, in which the stator may cause the rotor to rotate about the stator in response to an input of electrical energy to the stator from the tether, thereby causing the propeller to rotate, and (ii) a power generation mode, in which the stator may generate electrical energy in response to rotation of the rotor relative to the stator via wind energy acting on the propeller. The generated electrical energy may be transmitted to the ground station via the tether.

In yet another aspect, a system is disclosed that may include rotor means, and stator means for causing the rotor means to rotate about the stator in response to an input of electrical energy to the stator means. The system may further include a rotor housing, means for electrically isolating the rotor means from the rotor housing, a stator plate, and means for electrically isolating the stator means from the stator plate.

These as well as other aspects, advantages, and alternatives, will become apparent to those of ordinary skill in the art by reading the following detailed description, with reference where appropriate to the accompanying drawings.

DETAILED DESCRIPTION

Exemplary methods and systems are described herein. It should be understood that the word "exemplary" is used herein to mean "serving as an example, instance, or illustration." Any embodiment or feature described herein as "exemplary" or "illustrative" is not necessarily to be construed as preferred or advantageous over other embodiments or features. More generally, the embodiments described herein are not meant to be limiting. It will be readily understood that certain aspects of the disclosed methods systems and can be arranged and combined in a wide variety of different configurations, all of which are contemplated herein.

I. Overview

Example embodiments may relate to rotor/stator assemblies for use as motors and/or generators, which may be used in a wind energy system, such as an aerial wind turbine (AWT) system.

By way of background, an AWT may include an aerial vehicle that flies in a path, such as a substantially circular path, to convert kinetic wind energy to electrical energy. In an example embodiment, the aerial vehicle may be connected to a ground station via an electrically conductive tether. While tethered, the aerial vehicle may: (i) fly at a range of elevations and substantially along the path, and return to the ground, and (ii) transmit electrical energy to the ground station via the tether. (In some embodiments, the ground station may transmit electricity via the tether to the aerial vehicle for take-off and/or landing.)

In the AWT system, it may be desirable to achieve a high operating voltage so as to minimize wire masses in the tether. A desirable operating voltage may not be feasible with a single motor or generator, due to practical limitations of the electronics in the motor or generator. However, a desirable operating voltage may be achieved by stacking the motors or generators in series.

While the stacked motors or generators may achieve the desired operating voltage, the stacked motors or generators may pose an isolation risk. In particular, if motors in the AWT system are referenced to different ground voltages, or if a ground is referenced to the bus voltage of another motor or generator, a loss of isolation could lead to the application of voltages to some components in the AWT system far beyond the voltages at which these components typically operate.

II. Example Systems

A. Example Airborne Wind Turbine (AWT)

Figure 1:
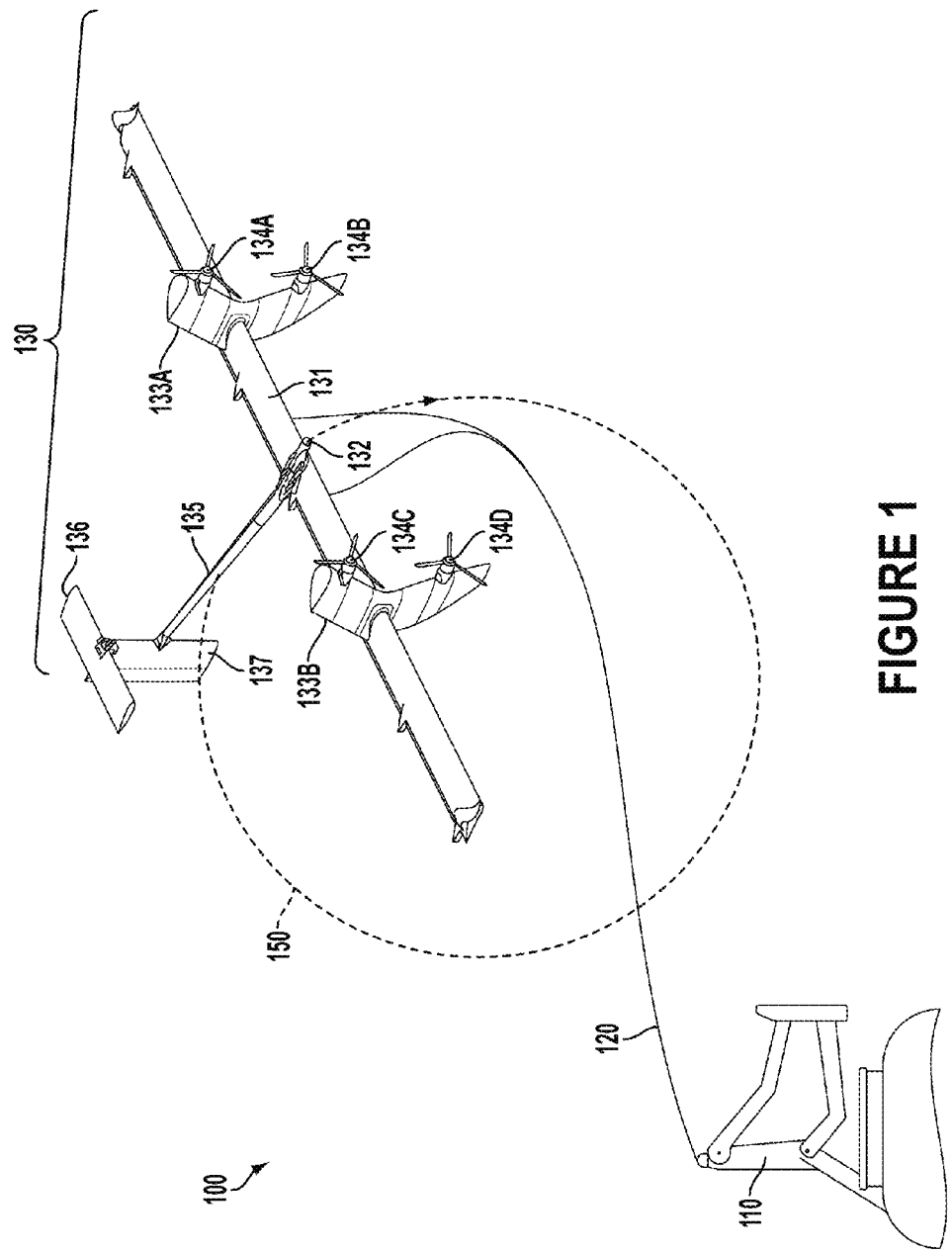
FIG. 1 illustrates an Airborne Wind Turbine (AWT), according to an example embodiment.

FIG. 1 depicts an AWT 100, according to an example embodiment. In particular, the AWT 100 may include a ground station 110, a tether 120, and an aerial vehicle 130. As shown in FIG. 1, the aerial vehicle 130 may be connected to the tether 120, and the tether 120 may be connected to the ground station 110. In this example, the tether 120 may be attached to the ground station 110 at one location on the ground station 110, and attached to the aerial vehicle 130 at two locations on the aerial vehicle 130. However, in other examples, the tether 120 may be attached at multiple locations to any part of the ground station 110 and/or the aerial vehicle 130.

The ground station 110 may be used to hold and/or support the aerial vehicle 130 until it is in an operational mode. The ground station 110 may also be configured to allow for the repositioning of the aerial vehicle 130 such that deploying of the device is possible. Further, the ground station 110 may be further configured to receive the aerial vehicle 130 during a landing. The ground station 110 may be formed of any material that can suitably keep the aerial vehicle 130 attached and/or anchored to the ground while in hover flight, forward flight, or crosswind flight.

In addition, the ground station 110 may include one or more components (not shown), such as a winch, that may vary a length of the tether 120. Such components will be described in greater detail later in this disclosure. For example, when the aerial vehicle 130 is deployed, the one or more components may be configured to pay out and/or reel out the tether 120. In some implementations, the one or more components may be configured to pay out and/or reel out the tether 120 to a predetermined length. As examples, the predetermined length could be equal to or less than a maximum length of the tether 120. Further, when the aerial vehicle 130 lands in the ground station 110, the one or more components may be configured to reel in the tether 120.

The tether 120 may transmit electrical energy generated by the aerial vehicle 130 to the ground station 110. In addition, the tether 120 may transmit electricity to the aerial vehicle 130 in order to power the aerial vehicle 130 for takeoff, landing, hover flight, and/or forward flight. The tether 120 may be constructed in any form and using any material which may allow for the transmission, delivery, and/or harnessing of electrical energy generated by the aerial vehicle 130 and/or transmission of electricity to the aerial vehicle 130. The tether 120 may also be configured to withstand one or more forces of the aerial vehicle 130 when the aerial vehicle 130 is in an operational mode. For example, the tether 120 may include a core configured to withstand one or more forces of the aerial vehicle 130 when the aerial vehicle 130 is in hover flight, forward flight, and/or crosswind flight. The core may be constructed of any high strength fibers. In some examples, the tether 120 may have a fixed length and/or a variable length. For instance, in at least one such example, the tether 120 may have a length of 140 meters.

The aerial vehicle 130 may be configured to fly substantially along a path 150 to generate electrical energy. The term "substantially along," as used in this disclosure, refers to exactly along and/or one or more deviations from exactly along that do not significantly impact generation of electrical energy as described herein and/or transitioning an aerial vehicle between certain flight modes as described herein.

The aerial vehicle 130 may include or take the form of various types of devices, such as a kite, a helicopter, a wing and/or an airplane, among other possibilities. The aerial vehicle 130 may be formed of solid structures of metal, plastic and/or other polymers. The aerial vehicle 130 may be formed of any material which allows for a high thrust-to-weight ratio and generation of electrical energy which may be used in utility applications. Additionally, the materials may be chosen to allow for a lightning hardened, redundant and/or fault tolerant design which may be capable of handling large and/or sudden shifts in wind speed and wind direction. Other materials may be used in the formation of aerial vehicle as well.

The path 150 may be various different shapes in various different embodiments. For example, the path 150 may be substantially circular. And in at least one such example, the path 150 may have a radius of up to 265 meters. The term "substantially circular," as used in this disclosure, refers to exactly circular and/or one or more deviations from exactly circular that do not significantly impact generation of electrical energy as described herein. Other shapes for the path 150 may be an oval, such as an ellipse, the shape of a jelly bean, the shape of the number of 8, etc.

As shown in FIG. 1, the aerial vehicle 130 may include a main wing 131, a front section 132, rotor connectors 133A-B, rotors 134A-D, a tail boom 135, a tail wing 136, and a vertical stabilizer 137. Any of these components may be shaped in any form which allows for the use of components of lift to resist gravity and/or move the aerial vehicle 130 forward.

The main wing 131 may provide a primary lift for the aerial vehicle 130. The main wing 131 may be one or more rigid or flexible airfoils, and may include various control surfaces, such as winglets, flaps, rudders, elevators, etc. The control surfaces may be used to stabilize the aerial vehicle 130 and/or reduce drag on the aerial vehicle 130 during hover flight, forward flight, and/or crosswind flight.

The main wing 131 may be any suitable material for the aerial vehicle 130 to engage in hover flight, forward flight, and/or crosswind flight. For example, the main wing 131 may include carbon fiber and/or e-glass. Moreover, the main wing 131 may have a variety dimensions. For example, the main wing 131 may have one or more dimensions that correspond with a conventional wind turbine blade. As another example, the main wing 131 may have a span of 8 meters, an area of 4 meters squared, and an aspect ratio of 15. The front section 132 may include one or more components, such as a nose, to reduce drag on the aerial vehicle 130 during flight.

The rotor connectors 133A-B may connect the rotors 134A-D to the main wing 131. In some examples, the rotor connectors 133A-B may take the form of or be similar in form to one or more pylons. In this example, the rotor connectors 133A-B are arranged such that the rotors 134A-D are spaced between the main wing 131. In some examples, a vertical spacing between corresponding rotors (e.g., rotor 134A and rotor 134B or rotor 134C and rotor 134D) may be 0.9 meters.

The rotors 134A-D may be configured to drive one or more generators for the purpose of generating electrical energy. In this example, the rotors 134A-D may each include one or more blades, such as three blades. The one or more rotor blades may rotate via interactions with the wind and which could be used to drive the one or more generators. In addition, the rotors 134A-D may also be configured to provide a thrust to the aerial vehicle 130 during flight. With this arrangement, the rotors 134A-D may function as one or more propulsion units, such as a propeller. Although the rotors 134A-D are depicted as four rotors in this example, in other examples the aerial vehicle 130 may include any number of rotors, such as less than four rotors or more than four rotors.

The tail boom 135 may connect the main wing 131 to the tail wing 136. The tail boom 135 may have a variety of dimensions. For example, the tail boom 135 may have a length of 2 meters. Moreover, in some implementations, the tail boom 135 could take the form of a body and/or fuselage of the aerial vehicle 130. And in such implementations, the tail boom 135 may carry a payload.

The tail wing 136 and/or the vertical stabilizer 137 may be used to stabilize the aerial vehicle and/or reduce drag on the aerial vehicle 130 during hover flight, forward flight, and/or crosswind flight. For example, the tail wing 136 and/or the vertical stabilizer 137 may be used to maintain a pitch of the aerial vehicle 130 during hover flight, forward flight, and/or crosswind flight. In this example, the vertical stabilizer 137 may be attached to the tail boom 135, and the tail wing 136 may be located on top of the vertical stabilizer 137. The tail wing 136 may have a variety of dimensions. For example, the tail wing 136 may have a length of 2 meters. Moreover, in some examples, the tail wing 136 may have a surface area of 0.45 meters squared. Further, in some examples, the tail wing 136 may be located 1 meter above a center of mass of the aerial vehicle 130.

While the aerial vehicle 130 has been described above, it will be understood that the methods and systems described herein could involve any suitable aerial vehicle that may be connected to a tether, such as the tether 120.

B. Illustrative Components of an AWT

Figure 2:
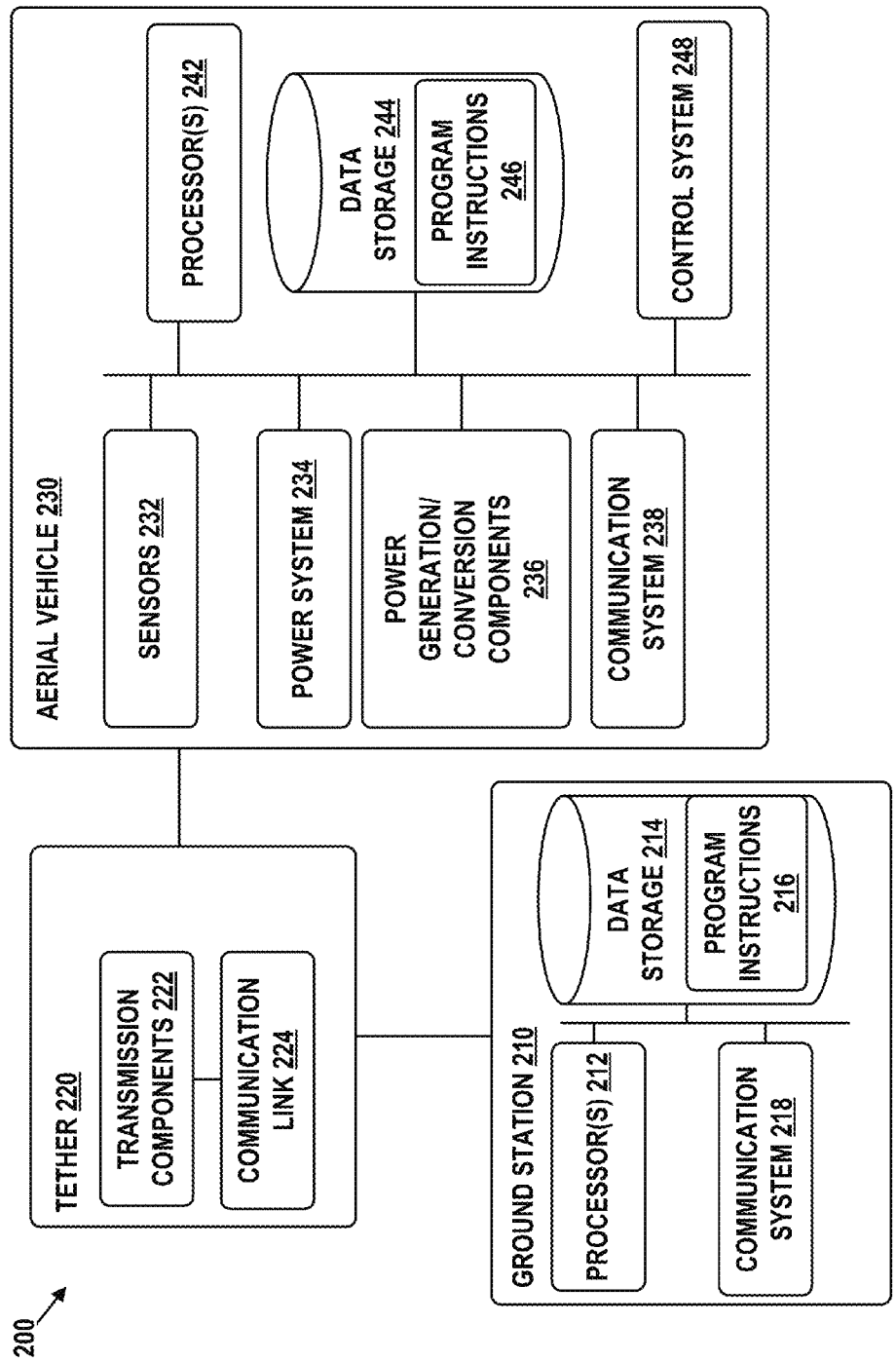
FIG. 2 illustrates a simplified block diagram illustrating components of an AWT, according to an example embodiment.

FIG. 2 is a simplified block diagram illustrating components of the AWT 200. The AWT 200 may take the form of or be similar in form to the AWT 100. In particular, the AWT 200 may include a ground station 210, a tether 220, and an aerial vehicle 230. The ground station 210 may take the form of or be similar in form to the ground station 110, the tether 220 may take the form of or be similar in form to the tether 120, and the aerial vehicle 230 may take the form of or be similar in form to the aerial vehicle 130.

As shown in FIG. 2, the ground station 210 may include one or more processors 212, data storage 214, and program instructions 216. A processor 212 may be a general-purpose processor or a special purpose processor (e.g., digital signal processors, application specific integrated circuits, etc.). The one or more processors 212 can be configured to execute computer-readable program instructions 216 that are stored in a data storage 214 and are executable to provide at least part of the functionality described herein.

The data storage 214 may include or take the form of one or more computer-readable storage media that may be read or accessed by at least one processor 212. The one or more computer-readable storage media may include volatile and/or non-volatile storage components, such as optical, magnetic, organic or other memory or disc storage, which may be integrated in whole or in part with at least one of the one or more processors 212. In some embodiments, the data storage 214 may be implemented using a single physical device (e.g., one optical, magnetic, organic or other memory or disc storage unit), while in other embodiments, the data storage 214 can be implemented using two or more physical devices.

As noted, the data storage 214 may include computer-readable program instructions 216 and perhaps additional data, such as diagnostic data of the ground station 210. As such, the data storage 214 may include program instructions to perform or facilitate some or all of the functionality described herein.

In a further respect, the ground station 210 may include a communication system 218. The communications system 218 may include one or more wireless interfaces and/or one or more wireline interfaces, which allow the ground station 210 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network. The ground station 210 may communicate with the aerial vehicle 230, other ground stations, and/or other entities (e.g., a command center) via the communication system 218.

In an example embodiment, the ground station 210 may include communication systems 218 that may allow for both short-range communication and long-range communication. For example, ground station 210 may be configured for short-range communications using Bluetooth and may be configured for long-range communications under a CDMA protocol. In such an embodiment, the ground station 210 may be configured to function as a "hot spot"; or in other words, as a gateway or proxy between a remote support device (e.g., the tether 220, the aerial vehicle 230, and other ground stations) and one or more data networks, such as cellular network and/or the Internet. Configured as such, the ground station 210 may facilitate data communications that the remote support device would otherwise be unable to perform by itself.

For example, the ground station 210 may provide a WiFi connection to the remote device, and serve as a proxy or gateway to a cellular service provider's data network, which the ground station 210 might connect to under an LTE or a 3G protocol, for instance. The ground station 210 could also serve as a proxy or gateway to other ground stations or a command station, which the remote device might not be able to otherwise access.

Moreover, as shown in FIG. 2, the tether 220 may include transmission components 222 and a communication link 224. The transmission components 222 may be configured to transmit electrical energy from the aerial vehicle 230 to the ground station 210 and/or transmit electrical energy from the ground station 210 to the aerial vehicle 230. The transmission components 222 may take various different forms in various different embodiments. For example, the transmission components 222 may include one or more conductors that are configured to transmit electricity. And in at least one such example, the one or more conductors may include aluminum and/or any other material which may allow for the conduction of electric current. Moreover, in some implementations, the transmission components 222 may surround a core of the tether 220 (not shown).

The ground station 210 may communicate with the aerial vehicle 230 via the communication link 224. The communication link 224 may be bidirectional and may include one or more wired and/or wireless interfaces. Also, there could be one or more routers, switches, and/or other devices or networks making up at least a part of the communication link 224.

Further, as shown in FIG. 2, the aerial vehicle 230 may include one or more sensors 232, a power system 234, power generation/conversion components 236, a communication system 238, one or more processors 242, data storage 244, and program instructions 246, and a control system 248.

The sensors 232 could include various different sensors in various different embodiments. For example, the sensors 232 may include a global positioning system (GPS) receiver. The GPS receiver may be configured to provide data that is typical of well-known GPS systems (which may be referred to as a global navigation satellite system (GNNS)), such as the GPS coordinates of the aerial vehicle 230. Such GPS data may be utilized by the AWT 200 to provide various functions described herein.

As another example, the sensors 232 may include one or more wind sensors, such as one or more pitot tubes. The one or more wind sensors may be configured to detect apparent and/or relative wind. Such wind data may be utilized by the AWT 200 to provide various functions described herein.

Still as another example, the sensors 232 may include an inertial measurement unit (IMU). The IMU may include both an accelerometer and a gyroscope, which may be used together to determine the orientation of the aerial vehicle 230. In particular, the accelerometer can measure the orientation of the aerial vehicle 230 with respect to earth, while the gyroscope measures the rate of rotation around an axis, such as a centerline of the aerial vehicle 230. IMUs are commercially available in low-cost, low-power packages. For instance, the IMU may take the form of or include a miniaturized MicroElectroMechanical System (MEMS) or a NanoElectroMechanical System (NEMS). Other types of IMUs may also be utilized. The IMU may include other sensors, in addition to accelerometers and gyroscopes, which may help to better determine position. Two examples of such sensors are magnetometers and pressure sensors. Other examples are also possible.

While an accelerometer and gyroscope may be effective at determining the orientation of the aerial vehicle 230, slight errors in measurement may compound over time and result in a more significant error. However, an example aerial vehicle 230 may be able mitigate or reduce such errors by using a magnetometer to measure direction. One example of a magnetometer is a low-power, digital 3-axis magnetometer, which may be used to realize an orientation independent electronic compass for accurate heading information. However, other types of magnetometers may be utilized as well.

The aerial vehicle 230 may also include a pressure sensor or barometer, which can be used to determine the altitude of the aerial vehicle 230. Alternatively, other sensors, such as sonic altimeters or radar altimeters, can be used to provide an indication of altitude, which may help to improve the accuracy of and/or prevent drift of the IMU.

As noted, the aerial vehicle 230 may include the power system 234. The power system 234 could take various different forms in various different embodiments. For example, the power system 234 may include one or more batteries for providing power to the aerial vehicle 230. In some implementations, the one or more batteries may be rechargeable and each battery may be recharged via a wired connection between the battery and a power supply and/or via a wireless charging system, such as an inductive charging system that applies an external time-varying magnetic field to an internal battery and/or charging system that uses energy collected from one or more solar panels.

As another example, the power system 234 may include one or more motors or engines for providing power to the aerial vehicle 230. In some implementations, the one or more motors or engines may be powered by a fuel, such as a hydrocarbon-based fuel. And in such implementations, the fuel could be stored on the aerial vehicle 230 and delivered to the one or more motors or engines via one or more fluid conduits, such as piping. In some implementations, the power system 234 may be implemented in whole or in part on the ground station 210.

As noted, the aerial vehicle 230 may include the power generation/conversion components 236. The power generation/conversion components 236 could take various different forms in various different embodiments. For example, the power generation/conversion components 236 may include one or more generators, such as high-speed, direct-drive generators. With this arrangement, the one or more generators may be driven by one or more rotors, such as the rotors 134A-D. And in at least one such example, the one or more generators may operate at full rated power wind speeds of 11.5 meters per second at a capacity factor which may exceed 60 percent, and the one or more generators may generate electrical power from 40 kilowatts to 600 megawatts.

Moreover, as noted, the aerial vehicle 230 may include a communication system 238. The communication system 238 may take the form of or be similar in form to the communication system 218. The aerial vehicle 230 may communicate with the ground station 210, other aerial vehicles, and/or other entities (e.g., a command center) via the communication system 238.

In some implementations, the aerial vehicle 230 may be configured to function as a "hot spot"; or in other words, as a gateway or proxy between a remote support device (e.g., the ground station 210, the tether 220, other aerial vehicles) and one or more data networks, such as cellular network and/or the Internet. Configured as such, the aerial vehicle 230 may facilitate data communications that the remote support device would otherwise be unable to perform by itself.

For example, the aerial vehicle 230 may provide a WiFi connection to the remote device, and serve as a proxy or gateway to a cellular service provider's data network, which the aerial vehicle 230 might connect to under an LTE or a 3G protocol, for instance. The aerial vehicle 230 could also serve as a proxy or gateway to other aerial vehicles or a command station, which the remote device might not be able to otherwise access.

As noted, the aerial vehicle 230 may include the one or more processors 242, the program instructions 244, and the data storage 246. The one or more processors 242 can be configured to execute computer-readable program instructions 246 that are stored in the data storage 244 and are executable to provide at least part of the functionality described herein. The one or more processors 242 may take the form of or be similar in form to the one or more processors 212, the data storage 244 may take the form of or be similar in form to the data storage 214, and the program instructions 246 may take the form of or be similar in form to the program instructions 216.

Moreover, as noted, the aerial vehicle 230 may include the control system 248. In some implementations, the control system 248 may be configured to perform one or more functions described herein. The control system 248 may be implemented with mechanical systems and/or with hardware, firmware, and/or software. As one example, the control system 248 may take the form of program instructions stored on a non-transitory computer readable medium and a processor that executes the instructions. The control system 248 may be implemented in whole or in part on the aerial vehicle 230 and/or at least one entity remotely located from the aerial vehicle 230, such as the ground station 210. Generally, the manner in which the control system 248 is implemented may vary, depending upon the particular application.

While the aerial vehicle 230 has been described above, it will be understood that the methods and systems described herein could involve any suitable aerial vehicle that may be connected to a tether, such as the tether 230 and/or the tether 110.

C. Example Rotor/Stator Assemblies

Figure 3A:
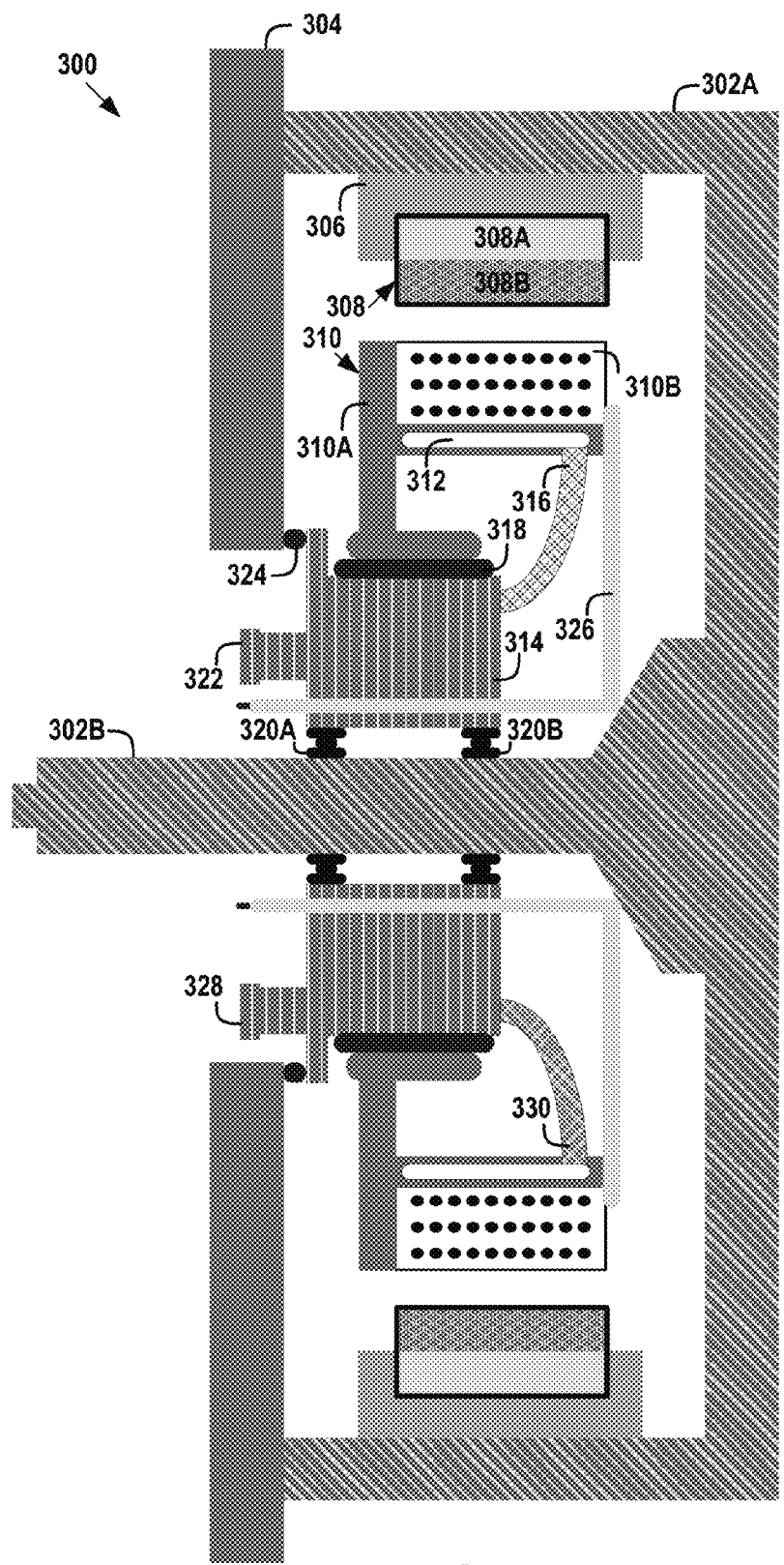
FIGS. 3A-B is a cross-section view illustrating a rotor/stator assembly (3A) that includes an integrated pump (3B), according to an example embodiment.
Figure 3B:
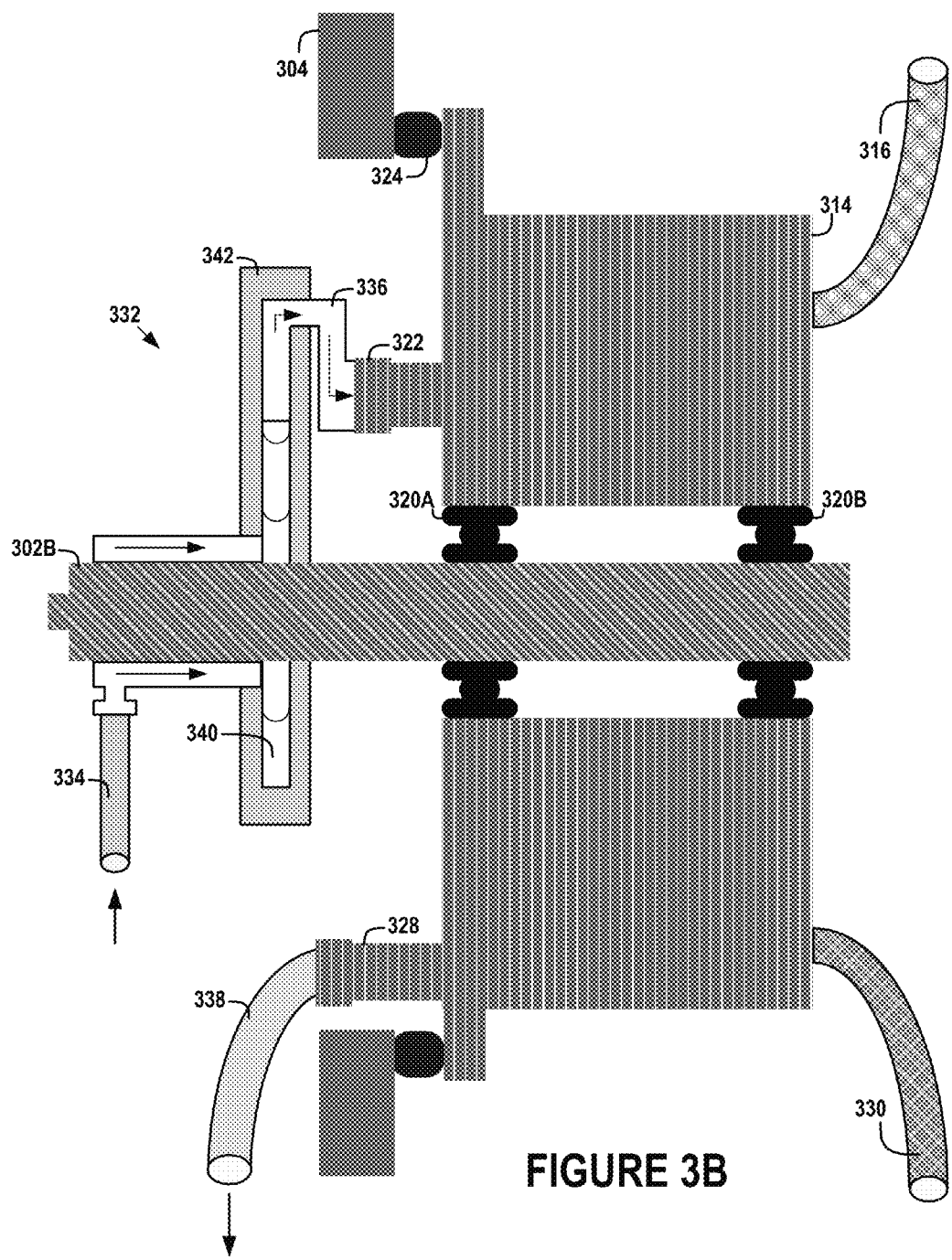

FIGS. 3A-B are cross-section views illustrating a rotor/stator assembly 300 (3A) that may include an integrated pump 332 (3B), according to an example embodiment. The rotor/stator assembly 300 may be designed for use in an aerial vehicle of an AWT, such as the aerial vehicle 130 illustrated in FIG. 1. In particular, the rotor/stator assembly 300 may be integrated with a power system in the aerial vehicle, such as the power system 234 described above in connection with FIG. 2.

The rotor/stator assembly 300 may act as both a motor and an electrical generator. To this end, the rotor/stator assembly 300 may be configured to operate in each of a flight mode and a power generation mode. In the flight mode, the rotor/stator assembly 300 may act as a motor, while in the power generation mode the rotor/stator assembly 300 may act as an electrical generator.

As shown, the rotor/stator assembly 300 may include a rotor housing 302A and rotor shaft 302B, a rotor backplate 304, a rotor insulator 306, and a rotor 308. The rotor 308 may include a rotor iron 308A and rotor magnets 308B. The rotor 308 may be electrically isolated from the rotor housing 302A by the rotor insulator 306, as shown.

Further, as shown, the rotor/stator assembly 300 may include a stator 310. The stator 310 may include a stator iron 310A and stator windings 310B. The rotor/stator assembly 300 further may include a stator plate 314. The stator 310 may be electrically isolated from the stator plate 314 by a stator insulator 318, as shown.

Beneficially, by electrically insulating the rotor 308 from the rotor housing 302A by means of the rotor insulator 306 and electrically insulating the stator 310 from the stator plate 314 by means of the stator insulator 318, an isolation risk of the rotor/stator assembly 300 may be reduced.

As shown, the stator 310 may be disposed coaxial to the rotor 308, and the rotor 308 may be configured to rotate about the stator. In the flight mode, in which the rotor/stator assembly 300 functions as a motor, the stator 310 may be configured to cause the rotor 308 to rotate about the stator 310 in response to an input of electrical energy to the stator 310. The rotor 308 may be coupled to a rotor shaft 302B, as shown, and the rotor shaft 302B may in turn be coupled to a propeller (not shown). Accordingly, when the rotor 308 rotates about the stator 310, the propeller may rotate as well. In the power generation mode, in which the rotor/stator assembly 300 functions as an electric generator, the stator 310 may be configured to produce electrical energy in response to rotation of the rotor 308 relative to the stator 310. The rotation of the rotor 308 may result from wind energy acting on the propeller. The electrical energy produced by the stator 310 may be transmitted to a ground station in the AWT system via a tether (e.g., an electrically conductive tether) connected to the ground station, as described above.

As noted, the stator 310, the stator plate 314, and the stator insulator 318 may be designed to remain stationary while the rotor/stator assembly 300 is in operation. To this end, the stator 310 may be physically coupled to the stator insulator 318, and the stator insulator 318 may be physically coupled to the stator plate 314, which may in turn be physically coupled to the rotor backplate 304 (e.g., via a seal 324), as shown. Further, the stator plate 314 may be rotatably coupled to the rotor shaft 302B via bearings 320A-B, as shown. Because the rotor backplate 304 may remain stationary during operation of the rotor/stator assembly 300, the stator 310, the stator plate 314, and the stator insulator 318 may remain stationary as well. The stator 310, the stator plate 314, and the stator insulator 318 may be designed to remain stationary in other manners as well.

The rotor housing 302A, rotor shaft 302B, and rotor 308 may be designed to rotate, while, as noted above, the rotor backplate 304 may be designed to remain stationary while the rotor/stator assembly 300 is in operation. To this end, the rotor backplate 304 may be rotatably coupled (e.g., via a bearing, not shown) to the rotor housing 302A.

In some embodiments, in addition to reducing isolation risks of the rotor/stator assembly 300, it may be desirable to cool the rotor/stator assembly 300. To this end, a cooling channel 312 may be formed in the stator iron 310A, as shown. The cooling channel 312 may allow coolant, such as a liquid coolant or a gas coolant, to pass through, thereby cooling the stator iron 310A.

To this end, the rotor/stator assembly 300 may additionally include a coolant inflow plug 322, a coolant inflow line 316, a coolant outflow line 330, and a coolant outflow plug 328. The coolant inflow plug 322 may be designed to receive the coolant. The coolant inflow plug 322 may receive the coolant from, for example, a heat exchanger, as described below in connection with FIG. 3B. The coolant inflow line 316 may provide the coolant from the coolant inflow plug 322 to the cooling channel 312. Further, the coolant outflow line 330 may provide the coolant from the cooling channel 312 to the coolant outflow plug 328, and the coolant outflow plug 328 may expel the coolant from the rotor/stator assembly 300. The coolant outflow plug 328 may expel the coolant towards, for example, a heat exchanger, as described below in connection with FIG. 3B.

The coolant may be pumped through the rotor/stator assembly 300 by a pump. To this end, the rotor/stator assembly 300 may be connectable to a pump. Alternatively, the rotor/stator assembly 300 may be integrated with a pump, as further described below in connection with FIG. 3B.

In order to preserve the reduced isolation risk of the rotor/stator assembly 300, one or more of the coolant inflow plug 322, the coolant inflow line 316, the coolant outflow line 330, and the coolant outflow plug 328 may be formed from non-conductive materials. Further, to preserve the reduced isolation risk of the rotor/stator assembly 300, the coolant itself may be nonconductive.

In some embodiments, the coolant may be a liquid, such as, for example, silicone oil, a high-temperature heat transfer oil, pure distilled water, or Fluorinert™. Other liquid coolants are possible as well. Alternatively, in some embodiments, the coolant may be a gas, such as, for example, helium. Other gas coolants are possible as well.

As shown, the rotor/stator assembly 300 further may include a seal 324. The seal 324 may serve to prevent contaminants (e.g., dust and water) from entering the rotor/stator assembly 300. Further, as shown, the rotor/stator assembly 300 may include one or more leads 326. The lead(s) 326 may be, for example, insulated power wires and/or electrically insulated signal wires, such as fiber optic cables. The leads may serve to transfer power to or from the stator 310. Additionally, the lead(s) 326 may serve to electrically connect the rotor/stator assembly 300 to one or more other components, such as, for example, a motor control system and/or another component of an aerial vehicle. In embodiments where the lead(s) 326 serve to electrically connect the rotor/stator assembly 300 to a motor control system, the motor control system may be mounted within an assembly housing that surrounds the rotor/stator assembly 300. The motor control system may be electrically isolated from the assembly housing by means of an insulator, so as to preserve the reduced isolation risk of the rotor/stator assembly 300.

As noted above, the coolant may be pumped through the rotor/stator assembly 300 by means of a pump. In some embodiments, such a pump may be integrated with the rotor/stator assembly 300. FIG. 3B illustrates a pump 332 that may be integrated with the rotor/stator assembly 300, according to an example embodiment.

As shown, the pump 332 may be designed to receive the coolant from, for example, a heat exchanger, through a coolant inlet 334. Further, the pump 332 may be configured to pump the coolant out to the rotor/stator assembly 300 via a first coolant exit 336. As shown, the first coolant exit 336 may be physically coupled to the coolant inflow plug 322 of the rotor/stator assembly 300.

Within the rotor/stator assembly 300, the coolant may be pumped through the coolant inflow line 316, the cooling channel 312, and the coolant outflow line 330, and out the coolant outflow plug 328. The coolant outflow plug 328 may be coupled to a second coolant exit 338, as shown. The coolant outflow plug 328 may expel the coolant towards, for example, a heat exchanger, via the second coolant exit 338. The heat exchanger may be configured to reject heat from the coolant into the air or another environment (e.g., water or another liquid) adjacent to or within the heat exchanger. To this end, the heat exchanger may, for example, take the form of a heat sink. Alternatively or additionally, the heat exchanger may be mounted inside of a flow diffuser. The flow diffuser may allow for efficient dissipation of the heat from the heat exchanger without significantly increasing aerodynamic drag. To this end, the flow diffuser may dissipate the heat through a number of thin metal strips that may be positioned on the aerial vehicle and may be located in a lower-speed air flow while the vehicle is in operation. The lower-speed air flow may result in reduced aerodynamic drag for a similar heat transfer device without a flow diffuser. In some embodiments, the rotor/stator assembly 300 may be implemented in an aerial vehicle, and the flow diffuser may be integrated with, for example, a rotor connector (e.g., pylon) in the aerial vehicle, such as the rotor connectors 133A-B described above in connection with FIG. 1. Other flow diffusers are possible as well.

Further, in embodiments where the rotor/stator assembly 300 is implemented in an aerial vehicle, the heat exchanger may, for example, be mounted on a surface of, e.g., a wing of the aerial vehicle. For instance, the heat exchanger may be mounted on a lower surface of the nearest wing of the aerial vehicle. Such a position of the heat exchanger may place the heat exchanger in a position to experience a higher-speed air flow while the aerial vehicle is in operation, thereby improving the dissipation of heat from the heat exchanger. The heat exchanger may be otherwise positioned as well.

As shown, the pump 332 may further include an impeller 340 and an impeller housing 342. The impeller 340 may be coupled to and may be disposed coaxially to the rotor shaft 302B. Further, the impeller 340 may share a common axis along the center of the rotor shaft 302B. In this manner, the pump 332 may run on the rotor shaft 302B of the rotor/stator assembly 300.

While FIG. 3B illustrates a pump 332 that is integrated with the rotor/stator assembly 300, in other embodiments the rotor/stator assembly 300 may be coupled to a pump that is separate from the rotor/stator assembly 300. The separate pump may be powered separately from the rotor/stator assembly 300 or via a drivetrain connected to rotor shaft 302B. The separate pump may exhibit functionality similar to the pump 332 described above in connection with FIG. 3B.

Figure 4:
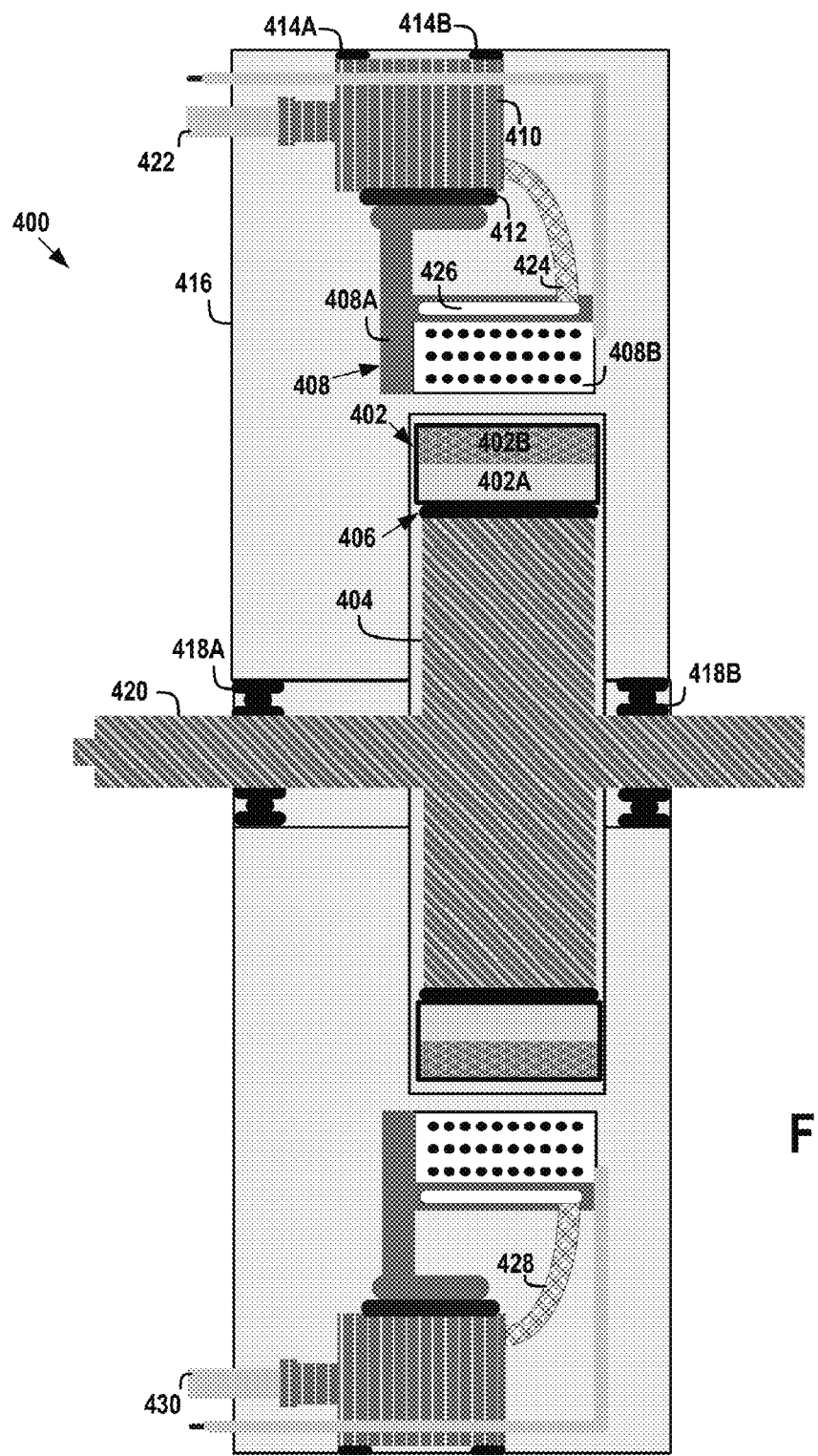
FIG. 4 is a cross-section view illustrating a rotor/stator assembly, according to another example embodiment.

FIG. 4 illustrates a rotor/stator assembly 400, according to another example embodiment. The rotor/stator assembly 400 may be designed for use in an aerial vehicle of an AWT, such as the aerial vehicle 130 illustrated in FIG. 1. In particular, the rotor/stator assembly 400 may be integrated with a power system in the aerial vehicle, such as the power system 234 described above in connection with FIG. 2.

The rotor/stator assembly 400 may act as both a motor and an electrical generator. To this end, the rotor/stator assembly 400 may be configured to operate in each of a flight mode and a power generation mode. In the flight mode, the rotor/stator assembly 400 may act as a motor, while in the power generation mode the rotor/stator assembly 400 may act as an electrical generator.

As shown, the rotor/stator assembly 400 may include a rotor 402, which may include a rotor iron 402A and rotor magnets 402B. Additionally, the rotor/stator assembly 400 may include a rotor mount 404. As shown, the rotor 402 may be electrically isolated from the rotor mount 404 by a nonconductive washer 406. Further, as shown, the rotor mount 404 may be coupled to the rotor 402. While the nonconductive washer 406 is shown to be positioned between the rotor 402 and the rotor mount 404, in some embodiments the nonconductive washer 406 may be embedded in the rotor mount 404. To this end, rotor mount 404 may, for example, include an outer portion and an inner portion that are each designed to clip to the nonconductive washer 406, which may be formed of, for example, a plastic material. Other rotor mounts and nonconductive washers are possible as well.

Further, as shown, the rotor/stator assembly 400 may include a stator 408. The stator 408 may include a stator iron 408A and stator windings 408B. The rotor/stator assembly 400 further may include a stator plate 410. As shown, the stator 408 may be electrically isolated from the stator plate 410 by a stator insulator 412. The stator plate 410 may additionally be electrically isolated from an assembly housing 416 that surrounds the rotor 402, rotor mount 404, stator 408, and stator plate 410, as shown, by means of nonconductive washers 414A, 414B.

As shown, the rotor 402 may be disposed coaxial to the stator 408, and the rotor 402 may be configured to rotate within the stator. In the flight mode, in which the rotor/stator assembly 400 functions as a motor, the stator 408 may be configured to cause the rotor 402 to rotate within the stator 408 in response to an input of electrical energy to the stator 408. The rotor 402 may be coupled to a rotor shaft 420, as shown, and the rotor shaft 420 may in turn be coupled to a propeller (not shown). Accordingly, when the rotor 402 rotates within the stator 408, the propeller may rotate as well. In the power generation mode, in which the rotor/stator assembly functions as an electric generator, the stator 408 may be configured to produce electrical energy in response to rotation of the rotor 402 relative to the stator 408. The rotation of the rotor 402 may result from wind energy acting on the propeller. The electrical energy produced by the stator 408 may be transmitted to a ground station in the AWT system via a tether (e.g., an electrically conductive tether) connected to the ground station, as described above.

The assembly housing 416 may be designed to remain stationary during operation of the rotor/stator assembly 400. To this end, the assembly housing 416 may be rotatably coupled to the rotor shaft 420 by bearings 418A, 418B. The assembly housing 416 may be designed to remain stationary in other manners as well.

Beneficially, by electrically insulating the rotor 402 from the rotor mount 404 by means of the nonconductive washer 406, and electrically insulating the stator 408 from the stator plate 410 by means of the stator insulator 412, each of the rotor 402 and the stator 408 may be electrically isolated from the assembly housing 416, such that an isolation risk of the rotor/stator assembly 400 may be reduced.

In some embodiments, in addition to reducing isolation risks of the rotor/stator assembly 400, it may be desirable to cool the rotor/stator assembly 400. To this end, the magnetic components of the rotor/stator assembly 400 (e.g., the stator iron 408A and the stator windings 408B) may be mounted to a frame that includes at least one cooling channel 426. Alternatively or additionally, the cooling channel(s) 426 may be formed through the stator iron 408A and/or through the stator winding 408B. The cooling channel 426 may be formed in other manners as well. The cooling channel 426 may allow coolant, such as a liquid coolant or a gas coolant, to pass through, thereby cooling the stator iron 408A.

To this end, the rotor/stator assembly 400 may additionally include a coolant inflow plug 422, a coolant inflow line 424, a coolant outflow line 428, and a coolant outflow plug 430. Each of the coolant inflow plug 422, the coolant inflow line 424, the coolant outflow line 428, and the coolant outflow plug 430 may be similar to the coolant inflow line 322, the coolant inflow line 316, the coolant outflow line 330, and the coolant outflow plug 328, respectively, described above in connection with FIG. 3A.

In some embodiments, the coolant may be pumped through the rotor/stator assembly 400 by a pump. To this end, the rotor/stator assembly 400 may be connectable to a pump. Alternatively, the rotor/stator assembly 400 may be integrated with a pump. For example, the rotor/stator assembly 400 may be integrated with a pump in a manner similar to that described above in connection with FIG. 3B.

Any of the rotor/stator assemblies described above may be implemented in AWT system, as noted above. Such an AWT system may include, for example, a ground station, an aerial vehicle, and an electrically conductive and insulated tether. The aerial vehicle may include a propeller and a rotor/stator assembly. The rotor/stator assembly may take any of the forms described above. For instance, the rotor/stator assembly may include a rotor, a rotor shaft, a rotor housing, a rotor insulator, a stator, a stator plate, and a stator insulator. The rotor may be electrically isolated from the rotor housing by the rotor insulator, and the stator may be electrically isolated from the stator plate by the stator insulator. The stator may be disposed coaxial to the rotor, and the rotor may be configured to rotate about the stator or vice-versa. The electrically conductive tether may be coupled to the stator and to the ground station. The propeller may be coupled to the rotor shaft.

The rotor/stator assembly in the AWT system may be configured for at least two modes of operation, as described above. First, the rotor/stator assembly may be configured to operate in a flight mode, in which the stator may be configured to cause the rotor to rotate about the stator in response to an input of electrical energy to the stator from the tether. When the rotor rotates, the propeller may rotate as well. As a result, the aerial vehicle may be configured to fly when the rotor/stator assembly operates in the flight mode. Second, the rotor/stator assembly may be configured to operate in a power generation mode, in which the stator may be configured to generate electrical energy in response to rotation of the rotor relative to the stator. The rotation of the rotor may result from wind energy acting on the propeller. The rotor/stator assembly may transmit the generated electrical energy to the ground station via the tether.

While a number of rotor/stator assembly designs are described above in connection with FIGS. 3A-4, it will be understood that other rotor/stator assembly are possible as well. For example, the rotor/stator assembly may take one or more of a high flux electric design, an axial flux design, a radial flux design, an outrunner design, and/or an inrunner design. Other designs are possible as well.

Further, while each of the rotor/stator assemblies 300, 400 described above included a cooling channel in the stator plate of the rotor/stator assembly, in other embodiments the cooling channel may be included in another component of the rotor/stator assembly. Alternatively, in some embodiments an example rotor/stator assembly may be integrated with a heat exchanger (e.g., the heat exchanger may be affixed to an assembly housing surrounding the rotor/stator assembly), and the coolant may surround the rotor/stator assembly (e.g., within the assembly housing). In these embodiments, heat from the rotor/stator assembly may be transferred to the heat exchanger via the coolant in the assembly housing. These embodiments may allow for a self-contained rotor/stator assembly that does not need to be connected to coolant lines or a pump. Still alternatively, in some embodiments no cooling mechanism may be included in the rotor/stator assembly at all.

III. Conclusion

The particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

We claim:

1. A motor comprising:
a rotor;
a rotor housing coupled to a rotor shaft;
a rotor insulator electrically isolating the rotor from the rotor housing;
a stator disposed coaxial to the rotor, wherein the stator is configured to cause the rotor to rotate about the stator in response to an input of electrical energy from a ground station via a tether to the stator;
a stator plate physically coupled to a rotor backplate and configured to dissipate heat from the motor; and a stator insulator electrically isolating the stator from the stator plate;

wherein the stator insulator is physically coupled to the stator and the stator plate.

2. The motor of claim 1, further comprising:
a coolant inflow plug;
a coolant inflow line;
a cooling channel in the stator;
a coolant outflow line; and
a coolant outflow plug, wherein (i) the coolant inflow plug is configured to receive a coolant, (ii) the coolant inflow line is configured to provide the coolant from the coolant inflow plug to the cooling channel, (iii) the coolant outflow line is configured to provide the coolant from the cooling channel to the coolant outflow plug, and (iv) the coolant outflow plug is configured to expel the coolant towards a heat exchanger.

3. The motor of claim 2, wherein the coolant inflow line is nonconductive.

4. The motor of claim 2, wherein the coolant outflow line is nonconductive.

5. The motor of claim 2, wherein the coolant is nonconductive.

6. The motor of claim 2, wherein the coolant comprises a liquid.

7. The motor of claim 2, wherein the coolant comprises a gas.

8. The motor of claim 2, wherein the motor is connectable to a pump configured to (i) pump the coolant into the coolant inflow plug, (ii) pump the coolant through the coolant inflow line, the cooling channel, and the coolant outflow line, and (iii) pump the coolant out the coolant outflow plug.

9. An electrical generator comprising:
a rotor;
a rotor housing; coupled to a rotor shaft;
a rotor insulator electrically isolating the rotor from the rotor housing;
a stator disposed coaxial to the rotor, and wherein the rotor is configured to rotate about the stator, and wherein the stator is configured to produce electrical energy in response to rotation of the rotor relative to the stator;
a stator plate physically coupled to a rotor backplate and configured to dissipate heat from the electric generator;
a stator insulator electrically isolating the stator from the stator plate; and
a pump, configured to pump a coolant through the electric generator;
wherein the stator insulator is physically coupled to the stator and the stator plate.

10. The electrical generator of claim 9, further comprising:
a coolant inflow plug;
a coolant inflow line;
a cooling channel in the stator;
a coolant outflow line; and
a coolant outflow plug, wherein (i) the coolant inflow plug is configured to receive the coolant, (ii) the coolant inflow line is configured to provide the coolant from the coolant inflow plug to the cooling channel, (iii) the coolant outflow line is configured to provide the coolant from the cooling channel to the coolant outflow plug, and (iv) the coolant outflow plug is configured to expel the coolant towards a heat exchanger.

11. The electrical generator of claim 10, wherein the coolant is nonconductive.

12. The electrical generator of claim 10, wherein the coolant comprises a liquid.

13. The electrical generator of claim 10, wherein the coolant comprises a gas.

14. The electrical generator of claim 10, wherein
the pump includes an impeller, wherein the impeller is coupled to the rotor shaft and shares a common axis along the center of the rotor shaft.

15. An aerial wind turbine comprising:
a ground station;
an aerial vehicle;
a rotor/stator assembly comprising:
a rotor;
a rotor shaft;
a rotor housing coupled to the rotor shaft;
a rotor insulator electrically isolating the rotor from the rotor housing;
a stator disposed coaxial to the rotor, wherein the rotor is configured to rotate about the stator,
a stator plate physically coupled to a rotor backplate and configured to dissipate heat from the rotor/stator assembly; and
a stator insulator is electrically isolating the stator from the stator plate wherein the stator insulator is physically coupled to the stator and the stator plate;
a propeller coupled to the rotor shaft;
an electrically conductive tether coupled to the stator and to the ground station; and
wherein the rotor/stator assembly is configured for at least two modes of operation: (i) a flight mode, wherein the stator is configured to cause the rotor to rotate about the stator in response to an input of electrical energy to the stator from the tether, thereby causing the propeller to rotate, and (ii) a power generation mode, wherein the stator is configured to generate electrical energy in response to rotation of the rotor relative to the stator via wind energy acting on the propeller, and wherein the generated electrical energy is transmitted to the ground station via the tether.

16. The aerial wind turbine of claim 15, wherein the rotor/stator assembly further comprises:
a coolant inflow plug;
a coolant inflow line;
a cooling channel in the stator;
a coolant outflow line; and
a coolant outflow plug, wherein (i) the coolant inflow plug is configured to receive a coolant, (ii) the coolant inflow line is configured to provide the coolant from the coolant inflow plug to the cooling channel, (iii) the coolant outflow line is configured to provide the coolant from the cooling channel to the coolant outflow plug, and (iv) the coolant outflow plug is configured to expel the coolant towards a heat exchanger.

17. The aerial vehicle of claim 16, further comprising a heat exchanger, wherein the coolant inflow plug is configured to receive the coolant from the heat exchanger, and the coolant outflow plug is configured to expel the coolant towards the heat exchanger.

18. The aerial vehicle of claim 17, further comprising a pump configured to (i) pump the coolant into the coolant inflow plug, (ii) pump the coolant through the coolant inflow line, the cooling channel, and the coolant outflow line, and (iii) pump the coolant out the coolant outflow plug.

19. The aerial vehicle of claim 18, wherein the pump includes an impeller, and wherein the impeller is coupled to the rotor shaft.

20. The aerial vehicle of claim 18, wherein the pump includes an impeller, wherein the impeller is disposed coaxially to the rotor shaft and coupled to the rotor shaft.

21. A rotor/stator assembly comprising:
a rotor;
a rotor mount;
a rotor insulator wherein the rotor is electrically isolated from the rotor mount by the rotor insulator;
a rotor shaft coupled to the rotor mount;
a stator disposed coaxial to the rotor, and wherein the rotor is configured to rotate relative to the stator;
a stator plate configured to dissipate heat from the rotor/stator assembly;
a stator insulator, wherein the stator is electrically isolated from the stator plate by the stator insulator and wherein the stator insulator is physically coupled to the stator and the stator plate;
an assembly housing enclosing the rotor and stator wherein the assembly housing is physically coupled to the stator plate;
a housing insulator, wherein housing is electrically isolated from the stator plate by the housing insulator; and
wherein the rotor/stator assembly is configured for at least two modes of operation: (i) a first mode, wherein the stator is configured to cause the rotor to rotate relative to the stator in response to an input of electrical energy to the stator, and (ii) a second mode, wherein the stator is configured to generate electrical energy in response to a rotation of the rotor relative to the stator via wind energy acting on a propeller.

22. The rotor/stator assembly of claim 21, further comprising:
a coolant inflow plug;
a coolant inflow line;
a cooling channel in the stator;
a coolant outflow line; and
a coolant outflow plug, wherein (i) the coolant inflow plug is configured to receive a coolant, (ii) the coolant inflow line is configured to provide the coolant from the coolant inflow plug to the cooling channel, (iii) the coolant outflow line is configured to provide the coolant from the cooling channel to the coolant outflow plug, and (iv) the coolant outflow plug is configured to expel the coolant towards a heat exchanger.

* * * * *